United States Patent [19]
Yusa

[11] Patent Number: 4,875,381
[45] Date of Patent: Oct. 24, 1989

[54] MOUNTING CONTAINER FOR MEASURING INSTRUMENTS

[76] Inventor: Toshikazu Yusa, 8-15, Ooyama-cho, Shibuya-ku, Tokyo, Japan

[21] Appl. No.: 158,765

[22] Filed: Feb. 22, 1988

[51] Int. Cl.⁴ .................... G01D 11/30; G01D 11/24
[52] U.S. Cl. .................................. 73/866.3; 73/431
[58] Field of Search ............................. 73/431, 866.3

[56] References Cited

U.S. PATENT DOCUMENTS

| | | | |
|---|---|---|---|
| 2,538,843 | 1/1951 | McGuire | 73/866.3 X |
| 3,768,314 | 10/1973 | Metzler et al. | 73/866.3 |
| 4,033,191 | 7/1977 | Krenz et al. | 73/431 |
| 4,034,612 | 7/1977 | Buckwitz | 73/431 |
| 4,197,747 | 4/1980 | Koehler | 73/431 |
| 4,348,899 | 9/1982 | Muller | 73/431 |
| 4,491,015 | 1/1985 | Allemano | 73/431 X |
| 4,552,391 | 11/1985 | Moore | 73/431 X |
| 4,638,666 | 1/1987 | Wong et al. | 73/431 |
| 4,697,464 | 10/1987 | Martin | 73/866.3 |

Primary Examiner—Tom Noland
Attorney, Agent, or Firm—Koda and Androlia

[57] ABSTRACT

A mounting container for measuring instruments including a relatively shallow upper case having fitting holes for measuring instruments and a shallow lower case having in its lower bottom an outer engaging bore and inner engaging bores. The upper and lower cases are engaged with each other in a detachable manner and the lower case is provided with an insertion hole formed in a part of its side wall with projections along the side surface so that a small case body such as a small flashlight provided with protruding portions can be fitted into the insertion hole. A hinge fitting having projections fitted into the engaging bores of the lower case is provided so as to hold the container upright. Thus, the container of the present invention is capable of optionally housing a plurality of measuring instruments such as a barometer, clock, radio, compass, thermometer, light, etc. into the fitting holes, making it convenient to directly reading the gauges and portable.

6 Claims, 2 Drawing Sheets

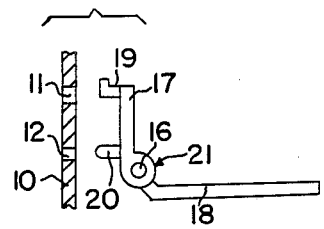
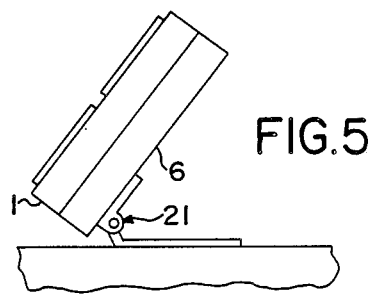
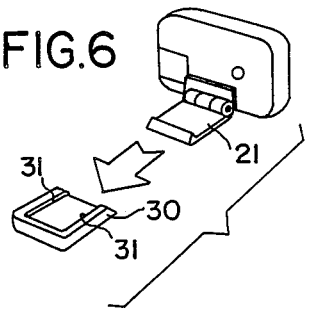

MOUNTING CONTAINER FOR MEASURING INSTRUMENTS

BACKGROUND OF THE INVENTION

1. Field of the Invention

The present invention relates to a multipurpose mounting container for a plurality of measuring instruments, such as a compass, radio, barometer, light, clock, thermometer, etc. which may be optionally combined therein.

2. Prior Art

Conventionally, a device has been known which combines measuring instruments such as clocks, compasses and other specified measuring instruments in a fixed container. However, in conventional types of containers the measuring instruments are securely fixed to the container and therefore it is impossible to interchange the instruments contained therein as necessary.

SUMMARY OF THE INVENTION

In view of the prior art, it is an object of the present invention to provide a container which can be disassembled so that a plurality of different kinds of measuring instruments can be disposed therein in a variety of combinations according to the intended use.

It is another object of the present invention to provide a container with a hinge fitting which makes direct reading of the instruments easy and allows the container to be conveniently carried and further can be used to clip the container in an optionally detachable manner.

In keeping with the principles of the present invention, the objects thereof are accomplished by a unique structure for a mounting container for a plurality of measuring instruments. The container includes a first shallow case having a plurality of engaging holes into which the measuring instruments are disposed and a second shallow case which has bores for engaging with a container stand. The first and second cases are attached to each other, forming the mounting container with the instruments disposed therein. The container is further provided with a compartment for disposing therein a small case body such as a flash light. The mounting container with the instruments therein can be hooked on a person's belt via a hinge fitting mounted to the container and further can be secured in a vehicle when the hinge fitting is mounted on a base stand which is glued to dashboard of the vehicle.

BRIEF DESCRIPTION OF THE DRAWINGS

The Figures show an embodiment of the present invention, in which:

FIG. 4 is a combination sectional view showing of a portion of the bottom of the lower case of the container having an outer engaging hole and an inner engaging hole and also shows a side view of the hinge fitting attached to the container;

FIG. 5 is a side view showing the hinge fitting attached to the container propped up against the surface of a table; and FIG. 6 is a schematic view of the container and a base which securely holds the container therein.

DETAILED DESCRIPTION OF THE INVENTION

Figure 1:
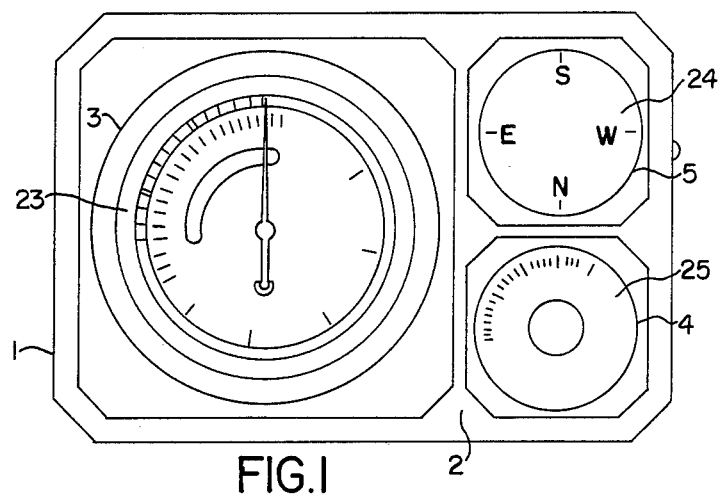
FIG. 1 is a plan view of the container.

The mounting container of this invention includes a relatively shallow upper case 1 and lower case 6.

Round fitting openings 3, 4 and 5 are provided in a top plate 2 of the upper case 1 which has an open bottom. In the drawings the opening 3 is the largest.

An insertion hole 7 is formed at one end of the side wall of the lower case 6 which has an open top. Also, projections 8 and 9 are formed along the side surfaces of the insertion hole 7.

The open sides of each of the upper and lower cases 1 and 6 face each other and engage with each other detachably to form the container of the present invention. This feature can be easily attained when the cases 1 and 6 are both made of plastic due to the elasticity.

An outer engaging bore 11 is formed in the lower case 6 near one side of the bottom plate 10 of the lower case 6. Inner engaging bores 12 and 13 are formed in the lower case 6 closer to the center of the bottom plate 10 of the lower case 6.

A small case body 15 is inserted into the insertion hole 7. The small case body 15 is provided with grooves 14 on both sides so that they engage with the projections 8 and 9 of the insertion hole 7 of the lower case 6.

In addition, a hinge fitting 21 constructed as described below is used with the above-described container. Projections 19 and 20 are provided on a first piece 17 of the hinge fitting 21 and is coupled with a second piece 18 of the hinge fitting 21 via a pin 16. One projection 19 formed at one end of the first piece 17 fits into the outer engaging bore 11 of the lower case 6. The other projections 20 (only one appears in the drawings) are formed closer to the center of the piece 17 and fit into the inner engaging bores 12 and 13 of the lower case 6, respectively. The piece 18 is designed so that it is a little longer than the piece 17 as seen in FIG. 4.

Measuring instruments are mounted on the container thus constructed by the upper case 1 and the lower case 6. Before assembling the container, appropriate measuring instruments 23, 24 and 25 (in the embodiment, reference numeral 23 is an altimeter, 24 is a compass and 25 is a thermometer) are snapped into the fitting openings 3, 4 and 5 of the upper case 1. With plastic cylindrical casings for these measuring instruments, frictional engagement can be attained between the openings and the instruments.

Figure 2:
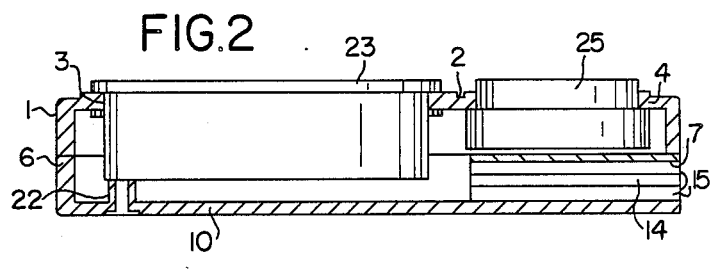
FIG. 2 is a sectional view thereof.
Figure 3:
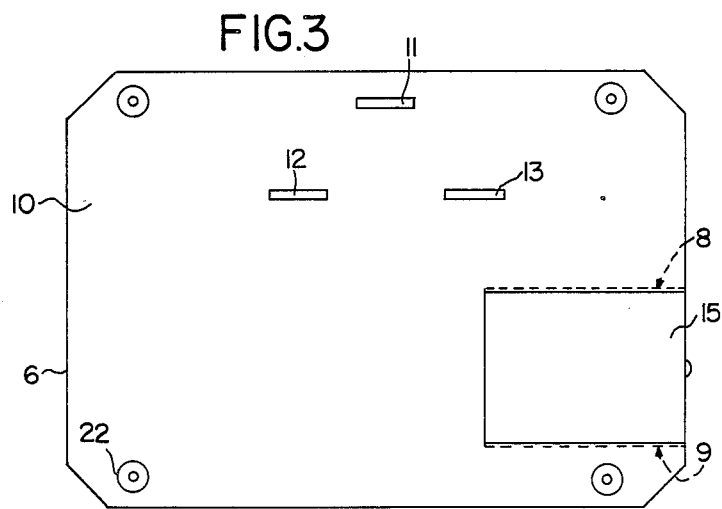
FIG. 3 is a bottom view thereof.

As seen in FIG. 2, the measuring instruments may be mounted to the container by pressing them from the outside of the container or may be inserted from the inside. In FIG. 2, the altimeter 23 is pressed into the opening 3 from the outside of the container, and the thermometer 25 is pressed into the opening 4 from the inside to face upward.

A small case body 15 is fitted into the hole 7. The small case body 15 is provided with a grooves 14 which engages with the projections 8 and 9 of the insertion hole 7 of the lower case 6. This small case body 15 may be a flashlight, but could also be any other type of measuring instrument.

The upper and the lower cases 1 and 6 are then engaged with each other with their respective open surfaces facing each other. The cases 1 and 6 make a frictional engagement with each other and form the container. Screws can be used for securely engaging these two cases.

The container is used in the above-described manner. Also, when a hinge fitting 21 is used, the projections 19 and 20, provided on the first piece 17 on one side of the hinge fitting 21, are fit into the outer engaging bore 11 and inner engaging bores 12 and 13 of the bottom plate 10 of the lower case 6. Thus, if the other piece 18 of the hinge fitting 21 is drawn toward the bottom plate 10 of the lower case 6 so as to close the gap, the container can be hooked on a person's belt via the hinge fitting 21 because the second piece 18 is a little longer than the first piece 17. Also, if the hinge is opened, it can be used as a stand for setting the container on a flat surface as shown in FIG. 5.

A mount base 30 can be used when the container is placed in an automobile, boat, etc. The mount base 30 has grooves 31 on both sides and self-adhesive tape (not shown) on the bottom. When the mount base 30 is fixed by self-adhesive tape on the dashboard of a car, for example, and the hinge fitting 21 is slid into the grooves, the container can be securely held by the mount base 30.

For easy attachment and detachment of the upper case 1 to and from the lower case 6, legs 22 with holes formed therein are provided so that they face each other toward the inside of their respective cases. Screws are inserted into these holes, although it is possible to use other means in place of this attachment/detachment means. For example, adhesive tape may be used.

When a flashlight is used as the small body case 15, it is possible to use it as lamp if it is fitted in the lower case 6. If the small case body 15 is pulled out of the lower case 6, it can be used to read the measuring instruments in the dark.

As should be apparent from the above description, according to the present invention a plurality of measuring instruments, such a compass, radio, altimeter, barometer, light, clock, hygrometer and/or thermometer can be mounted on the container by optionally incorporating them therein, thus providing a multipurpose measuring device. The container provided by this invention is convenient for directly reading the measuring instruments as well for carriage. Thus, the present invention is very high in value for actual application.

I claim:

1. A mounting container for housing therein a plurality of measuring instruments each comprising a case body, the mounting container comprising:
   fitting openings formed in an upper bottom of a shallow upper case with a lower bottom thereof opened;
   an insertion hole formed by cutting through a part of a side of a shallow lower case with a top thereof opened;
   projections formed along a side surface of said insertion hole;
   said upper case and lower case arranged to engage with each other such that the respective open surface of said cases face each other and the cases can be attached and detached;
   an outer engaging bore formed in the lower case near one side of a lower bottom of said lower case, and inner engaging bores formed in the lower case closer to the center of the lower bottom of said lower case;
   a case body small in comparison to the size of any of the case bodies of the housed measuring instruments inserted into said insertion hole via projecting portions which fit into projections provided along side surfaces of said insertion hole of said lower case; and
   a hinge fitting comprising first and second pieces coupled by a pin, said first piece of said hinge fitting having projections which are inserted into said outer engaging bore and inner engaging bore, said second piece of said hinge fitting being a little longer than said first piece.

2. A mounting container for housing a plurality of measuring instruments each comprising a case body, the mounting container comprising:
   a first shallow case provided with a plurality of engaging openings into which said measuring instruments are fitted; and
   a second shallow case with engaging bores for engaging with a container stand, said second case being attached to said first case to form said mounting container and further provided with a compartment for disposing therein a case body small in comparison to the size of any of the case bodies of the housed measuring instruments.

3. A mounting container according to claim 2, wherein said measuring instruments are a combination selected from clocks, radio receivers, barometers, compasses, altimeters, hydrometers or thermometers, and said small case body is a flashlight.

4. A mounting container according to claim 2, wherein said container stand is in a hinge-shape and is detachable from said mounting container by way of projections formed on said container stand which can be fitted into said engaging bores of said second case.

5. A mounting container according to claim 4, wherein said container stand comprises:
   a first piece provided with said projections which engage with said engaging bores of said second case; and
   a second piece connected to said first piece through a pin so that said first and second pieces can pivot about said pin, said second piece being longer than said first piece.

6. A mounting container according to claim 4, wherein said container stand further includes a mount base which is engageable with said container stand on one side and is provided with self-adhesive tape on an opposite side thereof.

* * * * *

UNITED STATES PATENT AND TRADEMARK OFFICE
CERTIFICATE OF CORRECTION

PATENT NO. : 4,875,381
DATED     : October 24, 1989
INVENTOR(S) : Toshikazu Yusa It is certified that error appears in the above-identified patent and that said Letters Patent is hereby corrected as shown below:

Title page:

Add:

Assignee: Tokyo Compass Mfg. Co., Ltd.,
                Tokyo, Japan

Signed and Sealed this

Second Day of October, 1990

Attest:

HARRY F. MANBECK, JR.

*Attesting Officer*      *Commissioner of Patents and Trademarks*